Aug. 25, 1964         D. D. HOCKETT         3,145,463
METHOD AND TOOL ARRANGEMENT FOR INSTALLING
AN O-RING IN A RECESS OF A BORE
Filed July 27, 1961
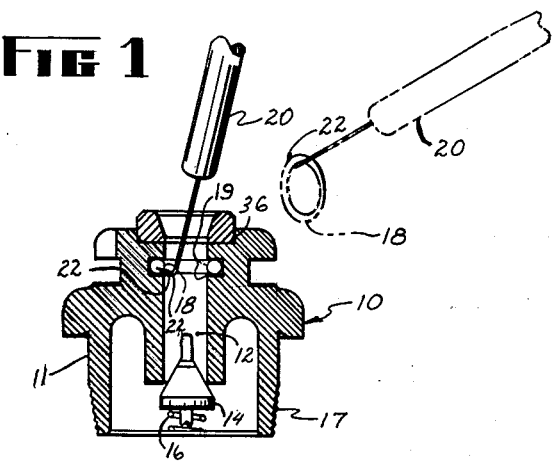
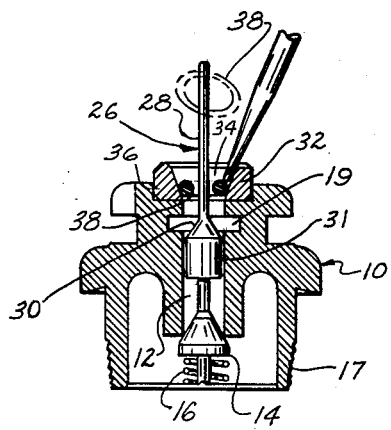
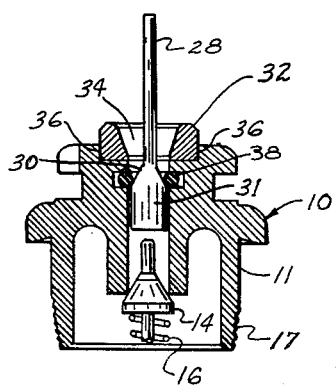
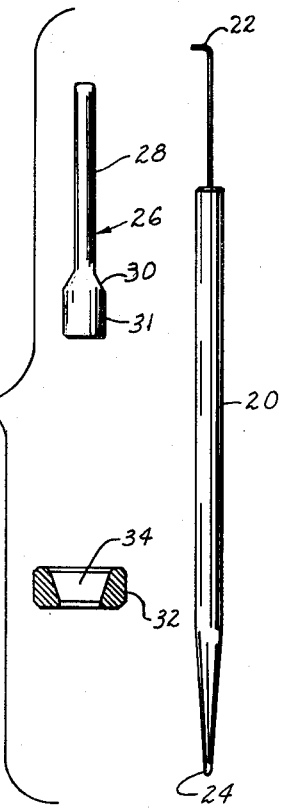
INVENTOR.
Donald D. Hockett
BY Bair, Freeman & Molinare
Attorneys

United States Patent Office 3,145,463
Patented Aug. 25, 1964

3,145,463
METHOD AND TOOL ARRANGEMENT FOR INSTALLING AN O-RING IN A RECESS OF A BORE
Donald D. Hockett, Marshalltown, Iowa, assignor to Fisher Governor Company, Marshalltown, Iowa, a corporation of Iowa
Filed July 27, 1961, Ser. No. 127,385
3 Claims. (Cl. 29—451)

This invention relates in general to tool arrangements for valve seals and more particularly to a tool arrangement and/or method for replacing an O-ring of the type carried intermediate the ends of a bore.

The present invention has its origin in the need for replacing an O-ring in a valve assembly of the type disclosed in application S.N. 68,768 filed November 14, 1960, now abandoned, by Johnson and Morris, and having a common assignee with the present invention. In the valve assembly disclosed in that application the O-ring was seated within the confines of a recess located at some distance intermediate the ends of a bore and with only one end of the bore being normally accessible. As may be appreciated, an arrangement which would permit the removal of the O-ring from its seat with the maximum of economy in both tools and labor presents a rather substantial problem under the circumstances.

It is therefore an object of the present invention to provide a tool arrangement and/or method which enables the replacement of an O-ring located intermediate the ends of a bore with the minimum difficulty and the maximum economy.

The manner of attaining the above and other objects of the present invention will become apparent on examination of the following specification, claims and drawings wherein:

FIGURE 1 shows a cross-sectional view of the head portion of a valve assembly disclosed in the aforementioned application with an O-ring about to be removed by one of the tools incorporated in the invention.

FIGURE 2 shows another portion of the tool assembly mounted on the head to enable a new O-ring to be inserted, together with the valve normally associated with the bore.

FIGURE 3 shows the placement of the new O-ring in its recess.

FIG. 4 shows the tools of the arrangement.

Referring now to the drawings, the head of the valve assembly is indicated by the reference character 10. The head comprises a body 11 in which is provided a bore 12. The bore is normally closed at one end by a valve 14 which is biased into the closed position by spring 16 seated in a valve body not shown here but disclosed in the aforementioned application. The valve body is engaged with the head 10 by means of the threads 17. The other end of the bore is adapted to be entered by a hollow probe whose exterior is sealed by the O-ring 18 located in the recess 19 spaced from the ends of bore.

The tool assembly seen in FIGURE 4 comprises an elongate pick and tamp member 20 having a pick or hook 22 at one end and a tapered tamping end 24. A bore guide 26 having a stem 28 and a conical seating or camming portion 30 terminating in an annular or cylindrical bore guiding end 31 is also provided, together with an O-ring guide member 32 having a conical passageway or aperture 34 therein.

To remove the old O-ring 18, the hook 22 is inserted in the bore 12 while assembled on the valve body, for example, and the O-ring 18 engaged by the hook is simply pulled from within the confines of the recess 19. The hook 22 then serves to lift the old ring 18 from the bore 12 as indicated by the broken lines in FIGURE 1.

To assemble or insert a new O-ring in place of O-ring 18, the bore guide 26 is inserted in the bore with the guide end 31 entering first until contact is made with the valve 14. The stem 28 then protrudes from the bore. The ring member 32 is now deposited over the stem 28 with the smaller end of the conical aperture 34 adjacent the bore 12. The ring guide 32 is maintained concentric with stem 28 by the annular flange or lip 36, provided on the head 10.

The new O-ring 38 is deposited over the stem 28 as indicated by the broken lines in FIGURE 2 and inserted into the widened or enlarged end of the aperture 34. The tapered end 24 of the tamp member 20 is then brought to bear against the back of the O-ring 38 and it is pushed down through the bore 12 until it is aligned with the recess 19. At this point it will be noted that the longitudinal dimensions of the camming portion 30 and guide portion 31 of bore guide 26 are chosen so that with the bore guide 26 seated against the valve 14 the camming portion 31 is adjacent the recess 19. Therefore, as the O-ring 38 is tamped down into the bore 12 by tamping end 24, it is caused to spread into the recess 19. This may be facilitated by the tamping of O-ring 38 outwardly from the camming portion when the ring is abreast of recess 19. The tamping tool 20 is then removed and the bore guide 26 simply withdrawn from the bore 12. As the camming portion 30 and guide 31 move completely past the O-ring 38, the O-ring is firmly spread into the recess 19 so that it is properly seated. During withdrawal of the guide 26, the ring member 32 may be tipped to disengage the flange 31 and be engaged on the bore guide 26 so that the two are removed as a unit. It will be apparent that although alignment of the O-ring with the recess is not normally easy to achieve, the tool arrangement of the present invention permits this important objective to the readily achieved.

While there has been shown and described illustrative embodiments of this invention, it will be obvious to those skilled in the art that the various changes and modifications may be made therein without departing from the invention, and therefore, it is intended in the appended claims to cover all such changes and modifications as fall within the true spirit and scope of the invention.

What I claim as new and desire to secure by Letters Patent of the United States is:

1. A tool arrangement for inserting a resilient, compressible O-ring in a recess located intermediate the ends of a small bore, said O-ring having an outer diameter greater than the diameter of said small bore so that the O-ring is subject to twisting as it is inserted into said small bore, the improvement comprising a stem member having a cam surface thereon terminating in a widened portion substantially filling said small bore when inserted therein, a guide member having a conical guide aperture therein, which small end of said guide aperture is of substantially the same diameter as said small bore, said guide member encircling said stem member for compressing the O-ring to the diameter of said small bore and aligning an O-ring encircling said stem member with said small bore, and a tamping member for urging said O-ring through said guide aperture, into said small bore and over said cam surface into said recess, withdrawal of said stem member from said small bore camming said O-ring outwardly and seating said O-ring in said recess.

2. A tool arrangement for inserting a resilient O-ring in a recess located intermediate the ends of a small bore which is normally closed at one end by a valve member, said O-ring having an outer diameter greater than the diameter of said small bore and thereby being subject to twisting as it is inserted into said small bore, the improvement comprising a stem member having a cam surface thereon terminating in a widened portion substantially filling said small bore when inserted therein, a guide member having a conical guide aperture therein, with the small end of said conical aperture being of substantial the same diameter as said small bore, and with said conical aperture being aligned with said small bore, and means for pushing an O-ring encircling said stem member through said guide aperture, into said small bore, and over said cam surface into said recess, withdrawal of said stem member from said small bore camming said O-ring outwardly and seating said O-ring firmly in said recess.

3. The method of inserting a resilient O-ring in a recess located intermediate the ends of a small bore which is normally closed at one end by a valve member, said O-ring being deformable and having an outer diameter greater than the diameter of said small bore so that the O-ring is subject to flexing and twisting as it is inserted into said small bore, said method comprising the steps of inserting a stem member having a cam surface thereon terminating in a widened portion substantially filling said small bore into said small bore until the cam surface is adjacent the recess, placing an O-ring about the stem member, applying pressure against the O-ring for compressing the O-ring to the diameter of said small bore and for pushing the O-ring into engagement with the recess, and withdrawing said stem member to cam outwardly and properly seat said O-ring in said recess.

References Cited in the file of this patent
UNITED STATES PATENTS

| | | |
|---|---|---|
| 743,400 | Sherman | Nov. 3, 1903 |
| 1,069,539 | Evans | Aug. 5, 1913 |
| 2,305,375 | Beasley et al. | Dec. 15, 1942 |
| 2,357,139 | Seme | Aug. 29, 1944 |
| 2,510,206 | Barkan et al. | June 6, 1950 |
| 3,016,605 | Heckethorn | Jan. 16, 1962 |